(12) United States Patent
Call et al.

(10) Patent No.: US 11,000,927 B2
(45) Date of Patent: May 11, 2021

(54) SYSTEM AND METHOD FOR MANUFACTURING A TOP MOUNT WITH BUSHING

(71) Applicant: MCS Manufacturing, LLC, Lyons, OH (US)

(72) Inventors: Aaron Call, Lyons, OH (US); Stephen Cameron, Marysville, OH (US)

(73) Assignee: MCS MANUFACTURING, LLC, Lyons, OH (US)

( * ) Notice: Subject to any disclaimer, the term of this patent is extended or adjusted under 35 U.S.C. 154(b) by 228 days.

(21) Appl. No.: 16/104,602

(22) Filed: Aug. 17, 2018

(65) Prior Publication Data

US 2019/0054579 A1   Feb. 21, 2019

Related U.S. Application Data

(60) Provisional application No. 62/547,310, filed on Aug. 18, 2017.

(51) Int. Cl.
*B23P 19/027* (2006.01)
*B23P 19/10* (2006.01)
*B23P 19/00* (2006.01)
*B23P 19/12* (2006.01)

(52) U.S. Cl.
CPC .......... *B23P 19/027* (2013.01); *B23P 19/105* (2013.01); *B23P 19/006* (2013.01); *B23P 19/12* (2013.01); *B23P 2700/14* (2013.01)

(58) Field of Classification Search
CPC ......... B23P 19/02; B23P 19/027; B23P 19/04; B23P 2700/14; Y10T 29/5397; Y10T 29/49945; Y10T 29/53104; Y10T 29/49696; Y10T 29/53678
See application file for complete search history.

(56) References Cited

U.S. PATENT DOCUMENTS

| | | | |
|---|---|---|---|
| 3,052,955 A * | 9/1962 | McAndrews | B23P 19/021 29/898.07 |
| 3,588,979 A | 6/1971 | Miller | |
| 5,519,933 A | 5/1996 | Sakashita et al. | |
| 5,715,721 A * | 2/1998 | Anders | B21D 19/08 72/311 |
| 7,073,364 B2 * | 7/2006 | Krish, Sr. | B21D 37/14 72/334 |
| 9,539,678 B2 * | 1/2017 | Call | B23P 19/02 |
| 2015/0158362 A1 | 6/2015 | Palka et al. | |
| 2015/0314662 A1 | 11/2015 | Call et al. | |

* cited by examiner

*Primary Examiner* — Tyrone V Hall, Jr.
(74) *Attorney, Agent, or Firm* — Jacob M. Ward; Ward Law Office LLC

(57) ABSTRACT

A system and method for manufacturing a top mount for a vehicle suspension includes providing a top mount body having a bushing opening and a plurality of stud holes, a plurality of knurled studs, and a bushing having a thermoplastic outer shell, a rubber core, and a central washer. The knurled studs are inserted in the stud holes of the top mount body. Then, substantially simultaneously, a pressure is applied to the knurled studs to press the knurled studs into the top mount body to crimp the knurled studs in the stud holes of the top mount body, and to insert the bushing into the bushing opening of the top mount body.

19 Claims, 14 Drawing Sheets

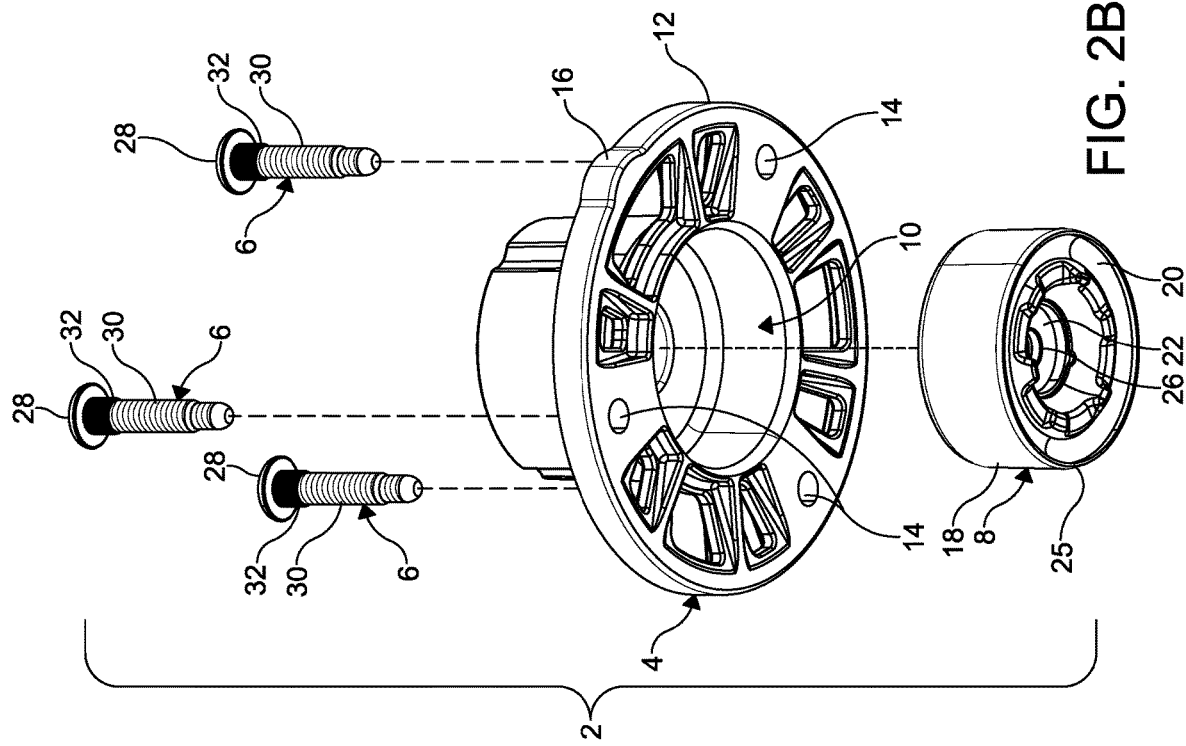
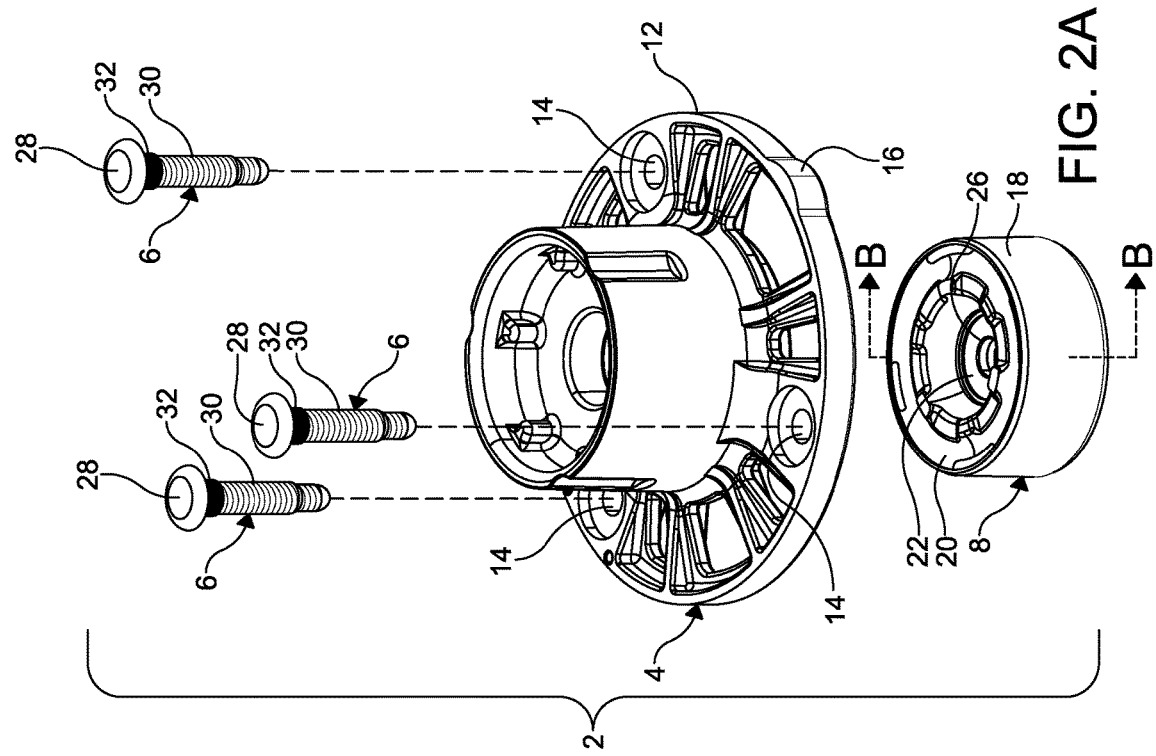

SYSTEM AND METHOD FOR MANUFACTURING A TOP MOUNT WITH BUSHING

CROSS-REFERENCE TO RELATED APPLICATIONS

This application claims the benefit of U.S. Provisional Application No. 62/547,310, filed on Aug. 18, 2017, the entire disclosure of which is hereby incorporated herein by reference.

FIELD

The present disclosure relates to top mounts for vehicle suspensions and, more particularly, to a system and method for assembly of a top mount with a bushing.

BACKGROUND

A top mount couples a vehicle suspension strut to a support structure of the vehicle, and improves spring suspension and ride, and jounce and rebound control. Conventional upper strut mounts include at least one resilient bushing, usually formed from a rubber body with a metal core. The bushing isolates and reduces transmission of road inputs to a vehicle body.

Traditionally, manufacturing of the top mount has required multiple stations for assembly. In a first station, the studs are attached to the mount plate. The incomplete top mount assembly is then removed from the first station and delivered to a second station, where the bushing is disposed within the top mount body. This multi-station process is inefficient, as it requires additional machinery for both transport and assembly of the top mount. This process also requires additional manpower, as separate stations must be maintained during the manufacturing process.

There is a continuing need for a system and method of assembling a top mount with a bushing at a single manufacturing station. Desirably, the system and method of assembling the top mount is efficient and permits for a rapid manufacture of the top mount by an individual operator.

SUMMARY

In concordance with the instant disclosure, a system and method for manufacturing a top mount with a bushing in a single manufacturing station, which is efficient and permits for a rapid manufacture of the top mount by an individual operator, has been surprisingly discovered.

In one embodiment, a system for manufacturing a top mount of a vehicle suspension includes an assembly die and a press head assembly. The assembly die includes a floating stripper top and a fixed die base. The floating stripper top has a primary opening, a plurality of stud openings, and a plurality of crimp block openings formed therethrough. The primary opening is configured to receive a bushing. The bushing has a thermoplastic outer shell, a rubber core, and a central washer. An upper surface of the floating stripper top is configured to receive a top mount body, also referred to as a "casting," in a position adjacent to the primary opening. The top mount body contains a plurality of knurled studs, which are disposed in stud holes of the top mount body. The stud openings are configured to receive the knurled studs.

The fixed die base of the assembly die, also referred to as a "stationary die base," has a plurality of swage assemblies. The fixed die base also supports a bushing rest. The floating stripper top is slidably disposed over both the swage assemblies and the bushing rest. Each of the swage assemblies is disposed in one of the crimp block openings of the floating stripper top. Each of the swage assemblies is also configured to receive one of the knurled studs. The bushing rest is disposed in the primary opening of the floating stripper top. The bushing rest is configured to support and align the bushing within the primary opening of the floating stripper top.

The press head assembly is configured to selectively move to and from a resting position spaced apart from the assembly die and a crimping position in contact with the assembly die. The press head assembly in the crimping position contacts the knurled studs to crimp the top mount body adjacent the knurled studs. This affixes the knurled studs to the top mount body. The press head assembly is also configured to force the floating stripper top and the top mount body downward onto the bushing supported by the bushing rest, to thereby affix the bushing to the top mount body by an interference fit. Both the crimping of the top mount body with the knurled studs and the affixing of the bushing to the top mount body are achieved with a single vertical downward motion of the press head assembly.

In another embodiment, the floating stripper top is coupled to a floating stripper top actuator. The floating stripper top actuator is configured to cause the floating stripper top to move a predetermined distance in tandem with the press head assembly, as the press head assembly moves toward the resting position following the crimping operation. For example, the floating stripper top actuator may be a pneumatic stroke cylinder. Also, the press head assembly is coupled to a press head assembly actuator. The press head assembly actuator is configured to cause the press head assembly to selectively move to and from the resting position and the crimping position. For example, the press head assembly actuator may be a hydraulic stroke cylinder.

The bushing rest of the fixed die base may have an annular recess formed in one end thereof. The annular recess is configured to receive a peripheral free edge of the thermoplastic outer shell of the bushing, which facilitates both the supporting and the alignment of the bushing within the primary opening of the floating stripper top.

Additionally, each of the swage assemblies may have a crimp block and a crimp block cap. The crimp block cap is removably affixed to the crimp block with at least one fastener. The crimp block is further received by a crimp block opening formed in the fixed die base. The crimp block cap may have a swage opening for receiving one of the knurled studs. The swage opening may have a chamfered swaging surface, for example, which is configured to swage the knurls on the stud and cause the crimping of the knurled stud to the top mount body as the knurled studs are seated in the swage assemblies under pressure from the press head assembly.

Furthermore, the floating stripper top have internal air flow passages formed therein. The internal air flow passages may be in communication with both a compressed air or gas source and the crimp block openings for delivery of compressed cleaning air or gas to the crimp block openings. It should be appreciated that the compressed cleaning air or gas may remove metal shreds or shavings that may otherwise accumulate in the crimp block openings by the swaging of the knurls on the studs in operation.

The system may also include a controller in communication with the actuators. The controller is configured to selectively move the press head assembly and the floating stripper top. The controller may also be in communication with a plurality of sensors including at least one of a force sensor and a position sensor. The sensors provide feedback on at least one of a force applied by the press head assembly and a position of at least one of the floating stripper top.

The plurality of sensors may also include a proximity sensor. The proximity sensor may be disposed on a front portion of the floating stripper top. The proximity sensor may also be covered by a sensor shield affixed to the floating stripper top. Where the top mount body has a locator disposed on a perimeter of the top mount body, a user may manually align the locator with the sensor shield indicating a proper positioning of the top mount body on the upper surface of the floating stripper top, prior to the method of assembling the top mount with the bushing.

The floating stripper top, the fixed die base, and the press head assembly may further be mounted in a unitary frame assembly. The system may also have a bushing oven. The bushing oven may be disposed adjacent to the unitary frame assembly containing the floating stripper top, the fixed die base, and the press head assembly. The bushing oven is configured to preheat the bushing to a predetermined temperature prior to the bushing being received by the primary opening of the floating stripper top.

In yet another embodiment, a method for manufacturing a top mount of a vehicle suspension with a bushing includes providing a top mount body having a bushing opening and a plurality of stud holes, a plurality of knurled studs, and the bushing. The knurled studs are then inserted in the stud holes of the top mount body. Substantially simultaneously, a pressure is applied to the top mount body to crimp the knurled studs in the stud holes of the top mount body, and to also insert the bushing into the bushing opening of the top mount body.

BRIEF DESCRIPTION OF THE DRAWINGS

The above, as well as other advantages of the present disclosure, will become readily apparent to those skilled in the art from the following detailed description, particularly when considered in the light of the drawings described hereafter.

FIG. 2A is an exploded top perspective view of a top mount for assembly with the system shown in FIG. 1, the top mount including a bushing, a top mount body, and studs to be assembled with the system;

FIG. 2B is an exploded bottom perspective view of the top mount shown in FIG. 2A;

DETAILED DESCRIPTION

Figure 1:
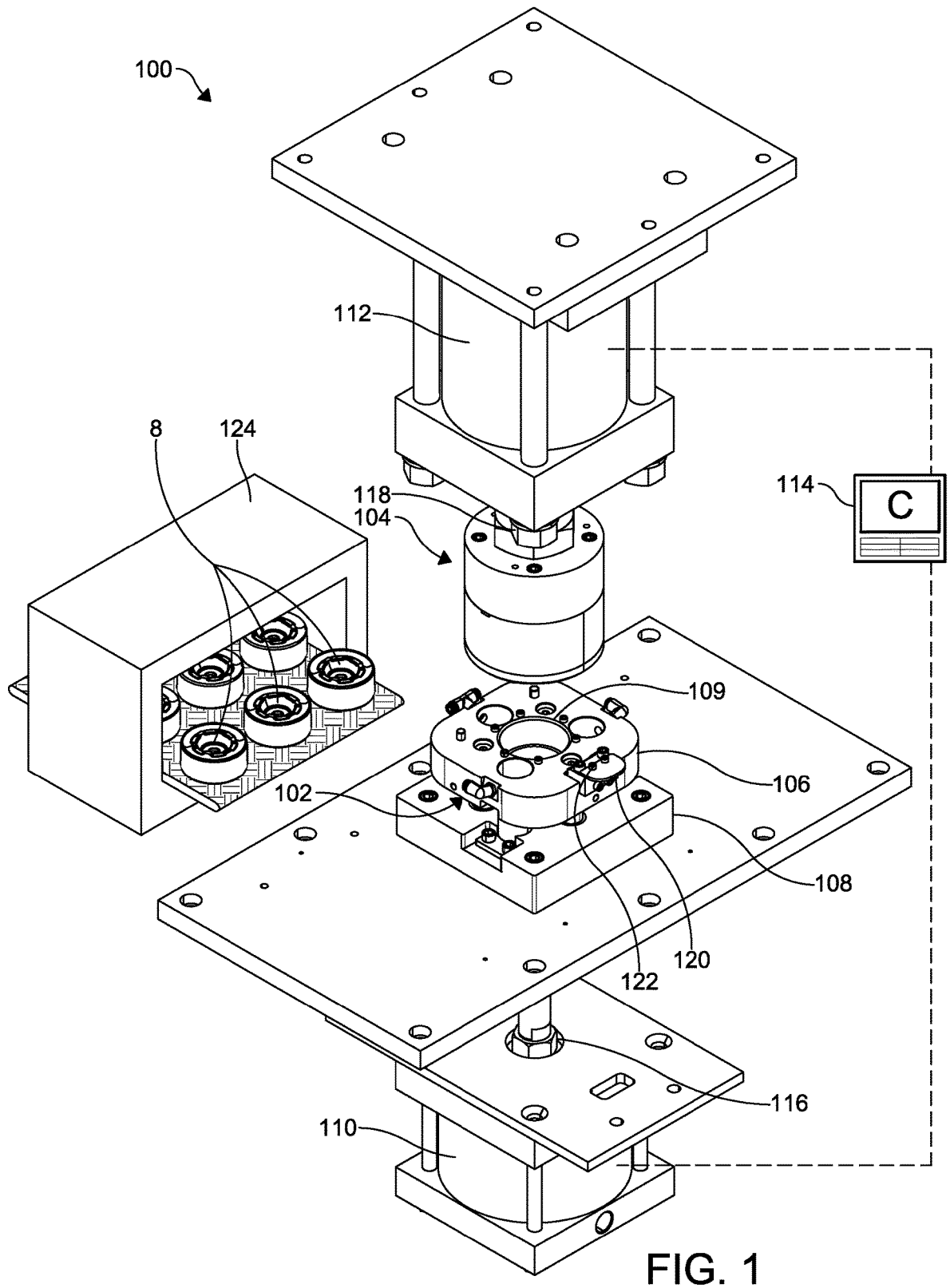
FIG. 1 is a top perspective view of a system for assembly of a top mount with a bushing, according to one embodiment of the disclosure.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical unless otherwise disclosed.

FIGS. 1-14 illustrate a top mount 2 for use in a vehicle suspension, and an associated system 100 and method 200 for manufacturing the top mount 2. In particular, FIGS. 2A and 2B show an exploded view of the component parts of the top mount 2 prior to assembly. The component parts of the top mount 2 include a top mount body 4, a plurality of knurled studs 6, and a bushing 8.

The illustrated top mount body 4 is of a generally annular shape, and further comprises a bushing opening 10. The bushing opening 10 has a semi-toroidal inner profile. An annular mounting flange 12 extends radially outwardly from the bushing opening 10. A plurality of stud holes 14 are disposed through the mounting flange 12.

Additionally, the annular mounting flange 12 of the top mount body 4 may be provided with a locator feature 16. The locator feature 16 may be provided as a protrusion disposed on a perimeter of the mounting flange 12 of the top mount body 4, for example. The locator feature 16 may be configured to align with a proximity sensor 120 (shown in FIGS. 2A and 2B), described further hereinbelow, to ensure a proper placement and orientation of the top mount body 4 in the system 100. In addition to the locator feature 16, the mounting flange 12 may also include other alignment features disposed therein for maintaining alignment of the stud holes 14 during assembly of the top mount 2.

Although described hereinabove having a generally annular shape, it should be appreciated that the top mount body 4 may be of any one of a plurality of different shapes, such as tri-ovular, elliptical, or polygonal, for example. Furthermore, the top mount body 4 can be made of any suitable material chosen by a skilled artisan, including a metal such as aluminum. The top mount body 4 may be a casting, or may be formed from any other suitable process, as desired.

Figure 8:
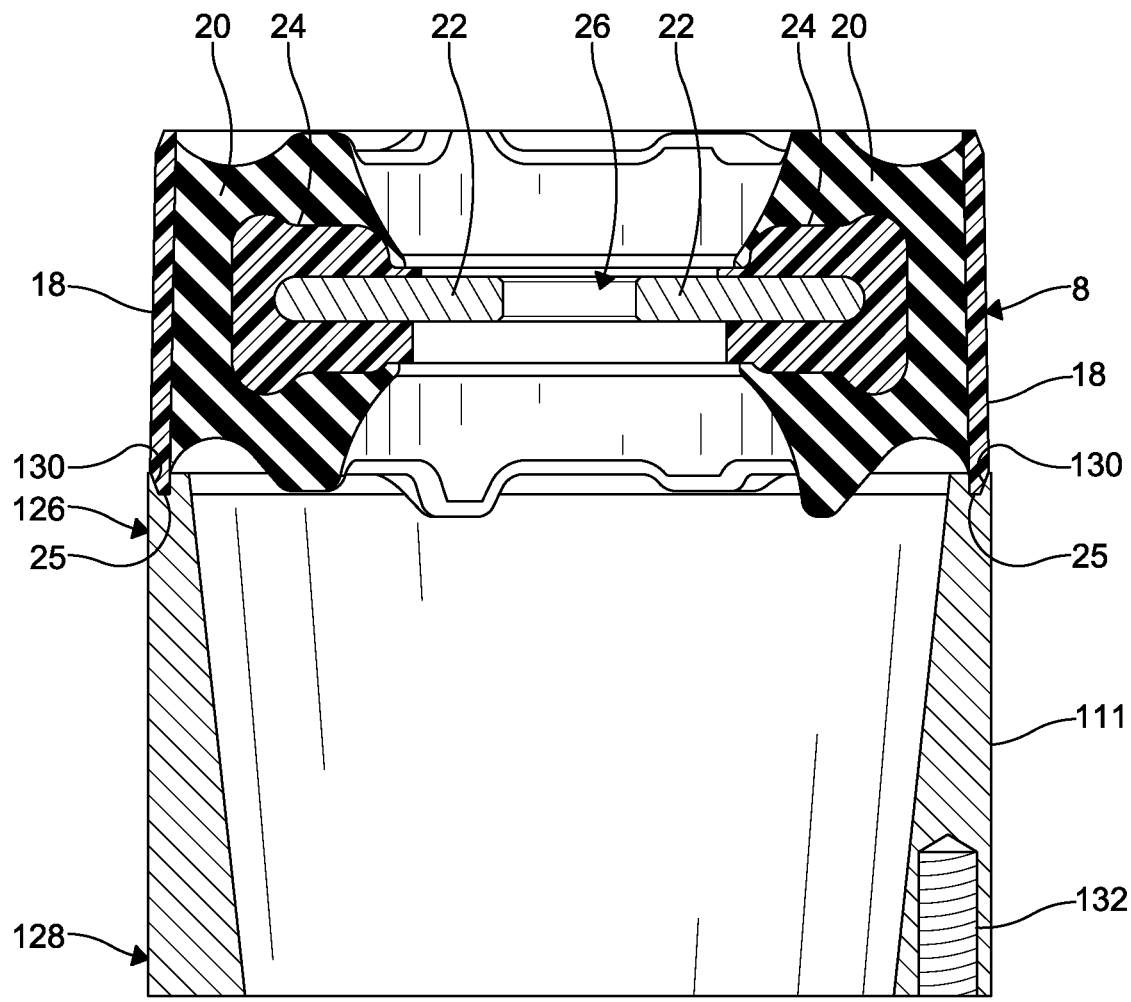
FIG. 8 is a cross-sectional, side elevational view of the bushing taken along section line B-B in FIG. 2A, and show seated with the bushing rest taken along section line C-C in FIG. 5.
Figure 9:
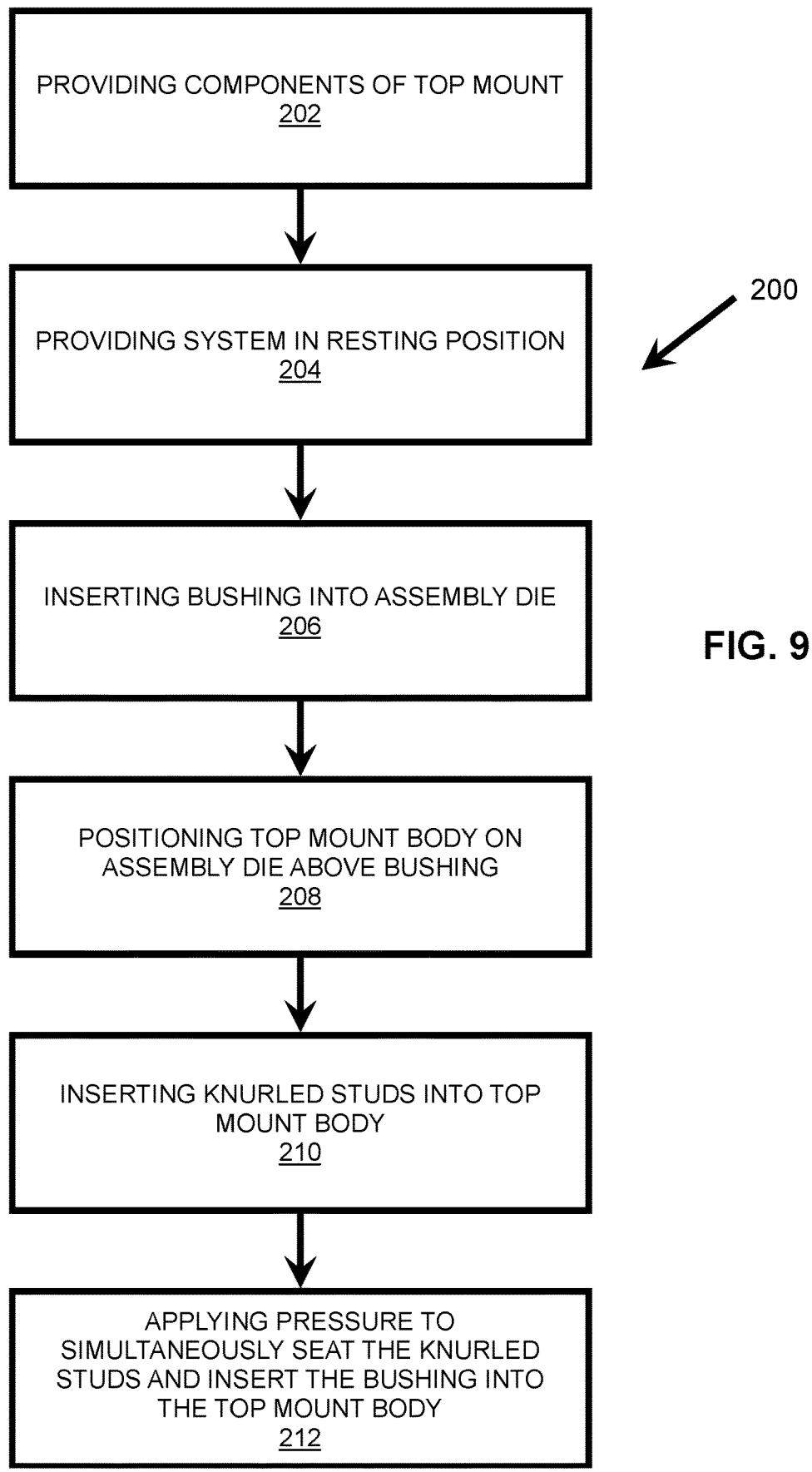
FIG. 9 is a flow diagram illustrating a method for assembly of a top mount using the system shown in FIG. 1, according to one embodiment of the present disclosure.

As shown in FIGS. 2A, 2B, and 8, the bushing 8 is a resilient member having a thermoplastic outer shell 18, a rubber core 20, and a central sleeve or washer 22. The central sleeve or washer 22 may further have a thermoplastic inner ring 24 that is overmolded on the washer 22, and which is further encapsulated by the rubber core 20. The bushing 8 may be substantially cylindrical in shape, having an inner bore hole 26 defined by the central washer 22. The outermost diameter of the bushing 8 is defined by the thermoplastic outer shell 18, and corresponds substantially to an innermost diameter of the bushing opening 10 of the top mount body 4. Due to these relative diameters, the bushing 8 may be constrained by a friction or interference fit with the top mount body 4 where pressed into the bushing opening 10 of the top mount body 4. The thermoplastic outer shell 18 further has a lower free edge 25, which is configured to centrally align the bushing 8 within the system 100 during the assembly operation or method 200 as described further herein.

In particular embodiments, the thermoplastic outer shell 18 and the thermoplastic inner ring 24 may be formed from a thermoplastic material that is rigid at temperatures associated with the operation of the top mount 2. As non-limiting examples, suitable thermoplastics materials may include a polyethylene material or a nylon material. The rubber core 20 may be formed from a cross-linked rubber compound including synthetic or natural rubbers filled with carbon black, and which have undergone vulcanization or other cross-linking. The central sleeve or washer 22 may be formed from a metal such as aluminum or steel. One of ordinary skill in the art may select other suitable materials for the thermoplastic outer shell 18, the rubber core 20, and the central washer 22, as desired.

With reference to FIGS. 2A and 2B, the knurled stud 6 has a head 28, a threaded shank 30 extending from the head 28, and a knurled shoulder 32. The knurled shoulder 32 is disposed intermediate the head 28 and the threaded shank 30. Prior to the method 200 described further herein, an outer diameter of the knurled shoulder 32 is generally greater than an inner diameter of the respective stud holes 14 of the top mount body 4. In particular, the knurled shoulder 28 may have a plurality of knurl protrusions that extending radially outwardly from the shank 26 of the knurled stud 6. The knurled stud 6 may be formed from a metal such as aluminum or steel, and preferably from a metal which permits the crimping or swaging operations as described further herein. One of ordinary skill in the art may also select other suitable materials for knurled studs 6 within the scope of the present disclosure.

FIGS. 1, 3-8, and 10-14 further illustrate the system 100 for assembly of the top mount 2 according to various embodiment of the present disclosure. As shown in FIG. 1, the system 100 may include a unitary frame assembly configured to assemble the top mount 2 in a single operation. For example, the system 100 may include an assembly die 102 and a press head assembly 104.

The assembly die may include a floating stripper top 106 and a fixed die base 108. The floating stripper top 106 has a primary opening 109 that is configured to receive the bushing 8 during the assembly method 200. The primary opening 109 also contains a bushing support 111, which is affixed in a stationary manner to the fixed die base 108. In particular, the floating stripper top 106 is slidably disposed over the stationary bushing support 111. The bushing support 111 is configured to hold the bushing 8 within the primary opening 109 during the assembly operation 200 described further herein.

The floating stripper top 106 may be coupled to a floating stripper top actuator 110, and the press head assembly 104 may be coupled to a press head assembly actuator 112. The floating top actuator 110 may be a pneumatic actuator, such as a pneumatic stroke cylinder, for example. The press head assembly actuator 112 may be a hydraulic actuator, such as a hydraulic stroke cylinder, for example. One of ordinary skill in the art may select other suitable types of actuators for the floating stripper top actuator 110 and the press head assembly actuator 112, including electromechanical actuators, as desired. Although only two actuators 110, 112 are shown, it should be appreciated that other numbers of the actuators 110, 112 may also be employed within the scope of the disclosure.

Figure 14:
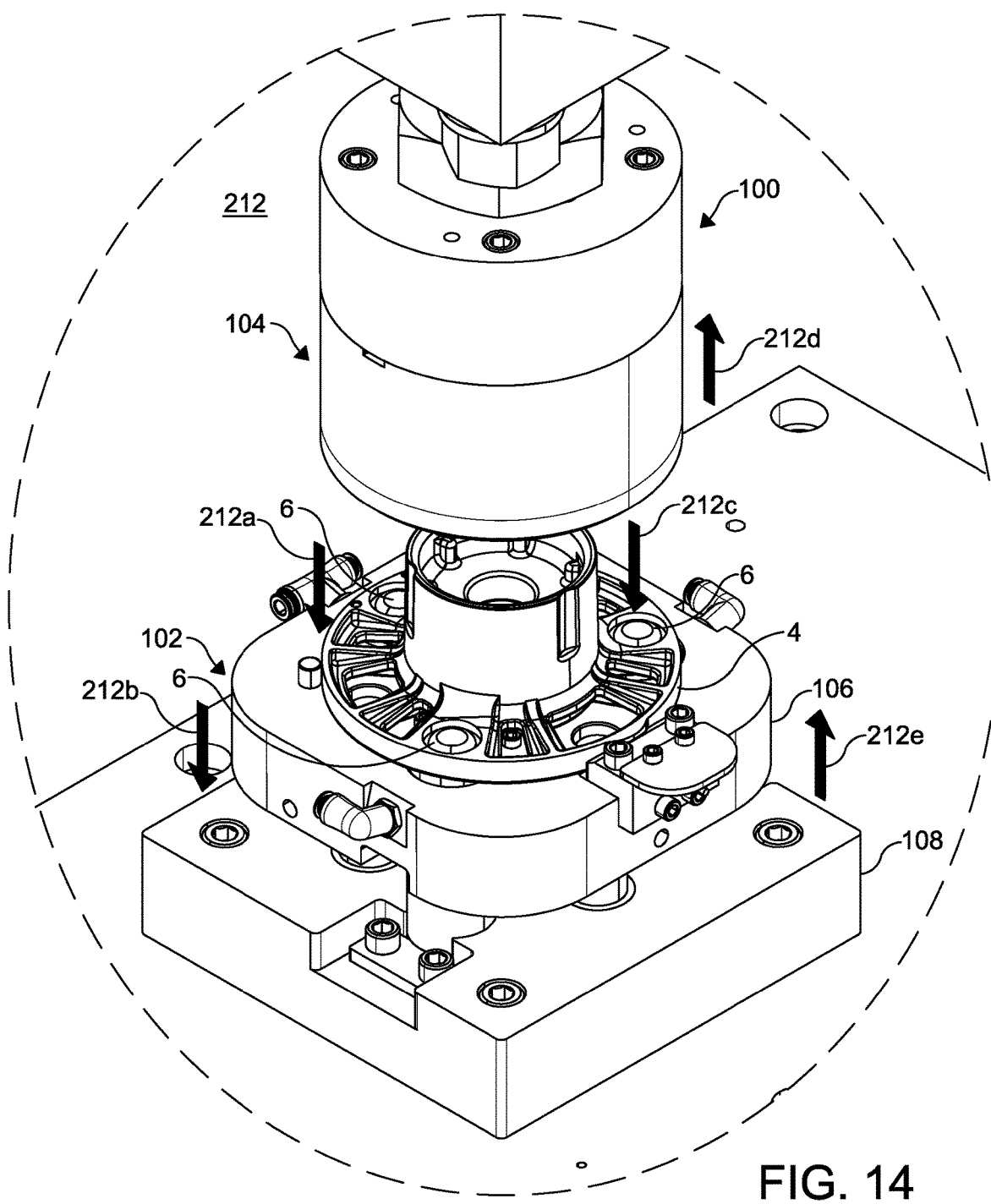
FIG. 14 is a partial top perspective view of the system shown in FIG. 1, depicted in operation from a fourth step through an eighth step of the assembly process, with arrows indicating movements of the press head assembly, the assembly die, and the bushing, the top mount body, and the studs of the top mount as assembled.

In particular, the press head assembly actuator 112 is configured to cause the press head assembly 104 to selectively move to and from a resting position and a crimping position, for example, as shown by the directional arrows in FIG. 14. The floating stripper top actuator 110 is configured to cause the floating stripper top 106 to move a predetermined distance in tandem with the press head assembly 104 as the press head assembly moves toward the resting position following the crimping operation, as also shown by the directional arrows in FIG. 14.

With renewed reference to FIG. 1, the system 100 may further include a controller 114. The controller 114 is configured to selectively move the press head assembly 104 and the floating stripper top 106. The controller 114 may include a processor in communication with a memory containing processor executable instructions for operating the system 100, for example. The controller 114 may include a user interface that permits the operator to manually actuate the system 100 according to a predetermined method 200, as another example. Any suitable type of user interface and control system may be employed as the controller 114 for the system 100 within the scope of the present disclosure.

The system 100 may further have a plurality of sensors 116, 118, 120. The sensors 116, 118, 120 may include at least one of a force sensor 116, a position sensor 118, and a proximity sensor 120, as non-limiting examples. The sensors 116, 118, 120 are in communication with the controller 114. The sensors 116, 118, 120 are configured to provide feedback on at least one of a force applied by the press head assembly 104, a position of at least one of the floating stripper top 106, and a proximity of the top mount body 4 when placed on the floating stripper top 106.

Where the proximity sensor 120 is used, for example, the proximity sensor 120 may be disposed on a front portion of the floating stripper top 106 to facilitate the sensing of the locator feature 16 of the top mount body 4 when placed and oriented appropriately on the floating stripper top 106. In particular, the floating stripper top 106 may have a sensor shield 122 affixed to the floating stripper top 106 and covering the proximity sensor 120. In operation, the operator may position the top mount body 4 so that the location feature 16 is adjacent to the sensor shield 122, and likewise adjacent to the proximity sensor 120, to thereby indicate a proper positioning of the top mount body 4 on the upper surface of the floating stripper top 106. Other means for ensuring the proper positioning of the top mount body 4 for the assembly operation may also be employed by a skilled artisan, as desired.

As shown in FIG. 1, it should be appreciated that the system 100 may further include a bushing oven 124. The bushing oven 124 may be an electric hot air circulation oven, for example, with a rotating track that carries multiple bushings 8 from a loading side of the bushing oven 124, through a heating compartment, to an unloading side of the bushing oven 124. The operator may remove the bushings 8 from the unloading side of the bushing oven 124 for insertion into the primary opening 109 of the floating stripper top 106.

The bushing oven 124 is configured to preheat the bushing 8 to a predetermined temperature prior to the bushing 8 being received by the primary opening 109 of the floating stripper top 106. For example, the bushing oven 124 may be configured to preheat the bushing 8 to a temperature of between about 95° F. and about 135° F., more particularly between about 105° F. and about 125° F., and most particularly about 115° F. The bushing oven 124 may be disposed adjacent the unitary frame assembly of the system 100, so that the temperature of the bushing 8, by the time it is inserted into the primary opening 109, is between about 90° F. and about 100° F., and most particularly about 95° F. It has been found that this range of temperatures results in a sufficient softening of the outer shell 18 to minimize an opportunity for cracking of the outer shell 18 during the assembly operation 200. Furthermore, the sufficient softening of the outer shell 18 minimizes or eliminates the need for oiling or lubrication of the primary opening 109. One of ordinary skill in the art may select other suitable temperatures for preheating the bushing 8, for example, depending on choice of materials for the thermoplastic outer layer 18 of the bushing 8, as desired.

Figure 5:
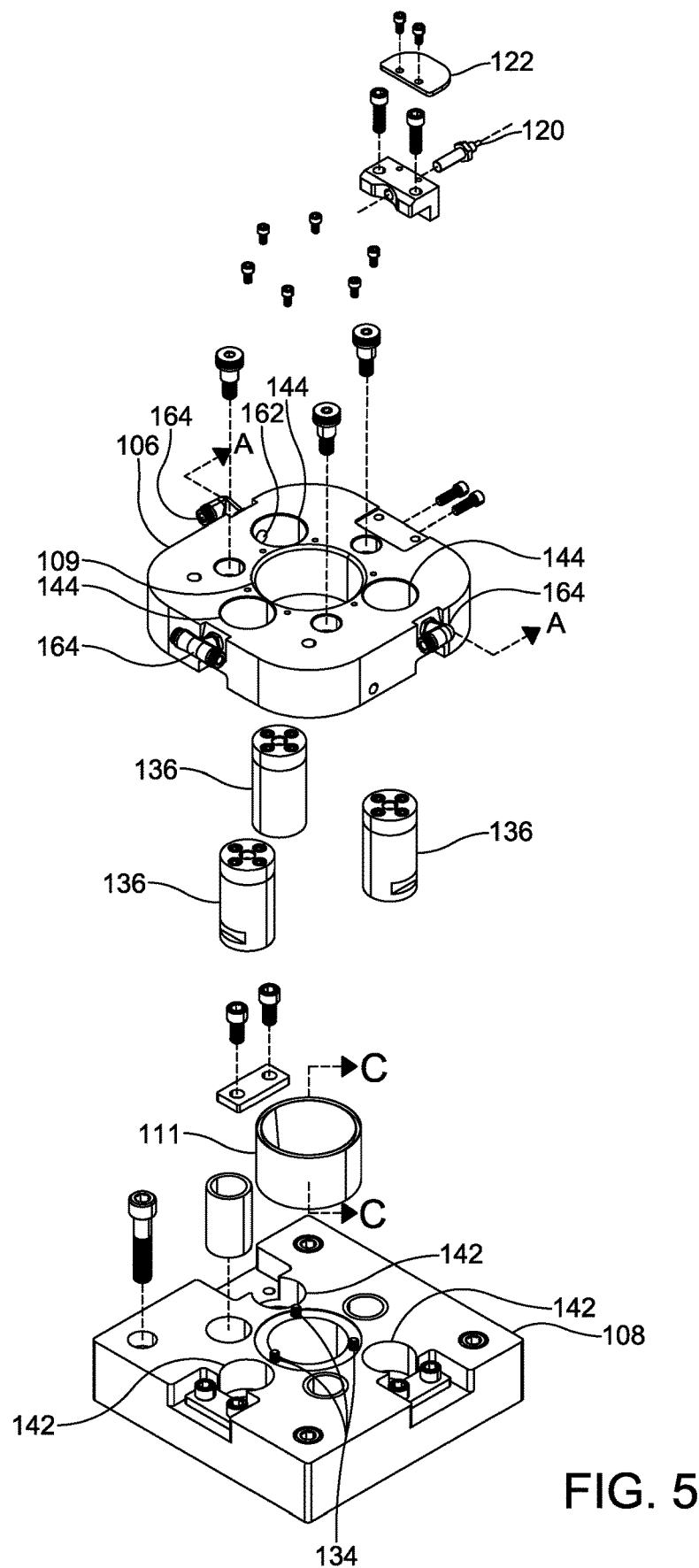
FIG. 5 is an exploded top perspective view of an assembly die of the system shown in FIG. 1 and further depicting a fixed die base, a floating stripper top, a bushing rest and a plurality of swage assemblies including crimp blocks and removable crimp block caps.

With reference to FIGS. 5 and 8, it should be understood that where the bushing 8 is disposed within the primary opening 109 of the floating stripper top 106 of the system 100, the bushing 8 is further supported in a stationary manner by the bushing support 111. The bushing support 11 includes a first end 126 and a second end 128. The first end 126 may have an annular recess 130 formed therein. The annular recess 130 is configured to receive free edge 25 of the bushing 8, and to centrally hold the bushing 8 within the primary opening 109 of the floating stripper top 106 during the assembly operation or method 200. The second end 128 of the bushing support 111 may also have a plurality of holes 132 that are configured to receive fasteners 134 (shown in FIG. 5) to securely affix the bushing support 111 to the fixed die base 108. The fasteners 134 militate against both a vertical movement and a horizontal movement of the bushing support 111 once affixed to the fixed die base 108. Other suitable means for affixing the bushing support 11 to the fixed die base 108 may also be employed by a skilled artisan within the scope of the present disclosure.

Figure 6A:
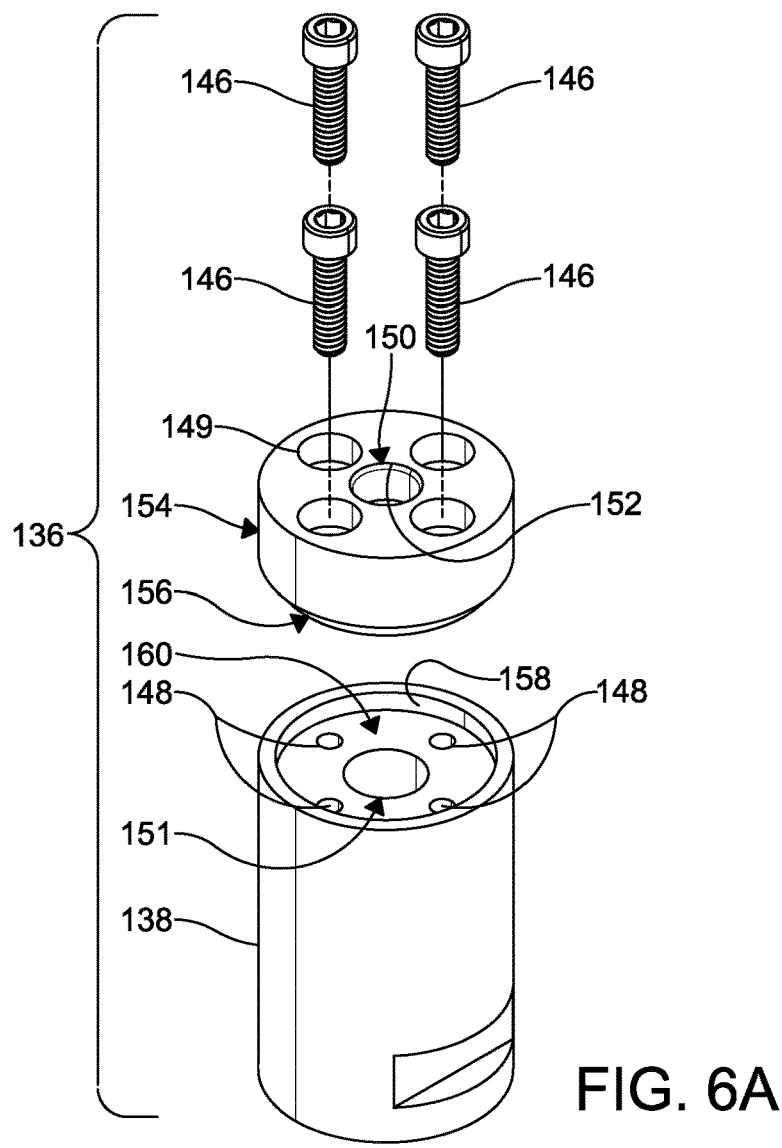
FIG. 6A is an exploded, enlarged top perspective view of a swage assembly shown in FIG. 5.
Figure 6B:
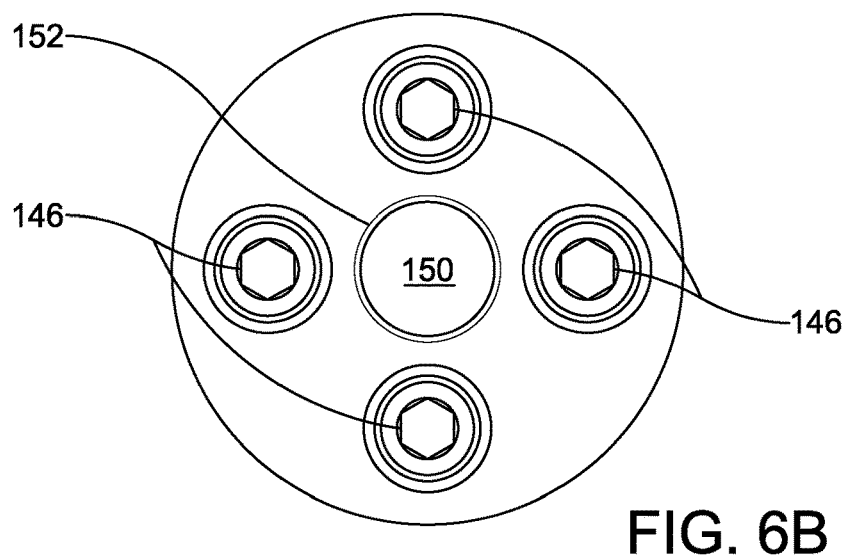
FIG. 6B is a fragmentary, enlarged top plan view of a removable crimp block cap of the swage assembly shown in FIG. 6A.

As shown in FIGS. 5 and 6A-6B, the fixed die base 108 of the assembly die 102 may further have a plurality of swage assemblies 136. Each of the swage assemblies 136 has a crimp block 138 and a crimp block cap 140. The crimp block 138 is received by both a first crimp block opening 142 formed in the fixed die base 108, and a second crimp block opening 144 formed in the floating stripper base 106. The crimp block cap 140 is removably affixed to the crimp block 138 with at least one fastener 146.

The crimp block 138 may have at least one first fastener hole 148, and the crimp block cap 140 may have at least one second fastener hole 149, each of which are configured to receive the at least one fastener 146 to removably secure the crimp block cap 140 to the crimp block 138. It should be appreciated the removability of the crimp block cap 140 is particularly advantageous, as it permits for a simple replacement of the crimp block cap 140 as it wears over time with repeated swaging operations of the system 100.

In particular, the crimp block cap 140 has a swage opening 150. The crimp block 138 may have central bore 151 that is axially aligned with the swage opening 150 where the crimp block cap 140 is affixed to the crimp block 138. As shown in FIGS. 6A and 6B, the crimp block cap 140 has a swage opening 150 for receiving one of the knurled studs 6. In particular, the swage opening 150 has a chamfered swaging surface 152. The chamfered swaging surface 152 is configured to deform the knurled shoulder 6 of knurled stud 6 when the knurled stud 6 is pressed through the stud hole 14 of the top mount body 4 and into the crimp block 138, in operation according to the method 200. The deformation of the knurled shoulder 32 by the chamfered swaging surface 152 causes the material of the knurled shoulder 32 to be pushed into the stud hole 14, resulting in a crimping and secure affixing of the knurled stud 6 to the top mount body 4. In certain examples, the chamfered swaging surface 152 is chamfered at an angle between about 35 degrees and about 55 degrees, and most particularly at a chamfer angle of about 45 degrees relative to the upper surface of the crimp block cap 140. However, it should be appreciated that other suitable angles for the chamfered swaging surface 152 of the crimp block cap 140 may be selected by a skilled artisan within the scope of the disclosure.

As also shown in FIG. 6A, the removable crimp block cap 140 may have an upper portion 154 and a lower portion 156. The upper portion 154 may have an outer diameter that is greater than an outer diameter of the lower portion 156. The crimp block 138 may further have an upper rim 158. The upper rim 158 may extend radially outwardly from an end of the crimp block 138. An inner diameter of the upper rim 158 may further be substantially the same as the outer diameter of the lower portion 156 of the crimp block cap 140. The upper rim 158 defines a recess 160 in the end of the crimp block 138 for receiving the lower portion 156 of the crimp block cap 140, for example, with a friction or interference fit that securely holds the crimp block cap 140 and aligns the crimp block cap 140 within the recess 160. In turn, this aligns the first fastener holes 148 and the second fastener holes 149 for use with the fasteners 146. Other means for aligning and securely holding the crimp block cap 140 on the crimp block 138 may also be used, as desired.

Figure 7:
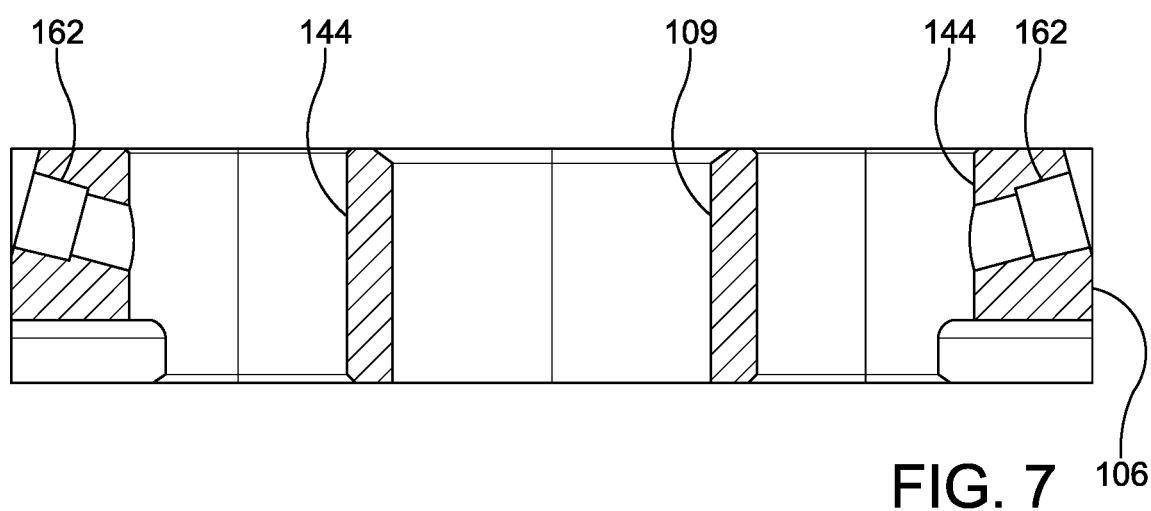
FIG. 7 is cross-sectional, top plan view of the stripper top taken along section line A-A in FIG. 5, and further depicting internal air flow passages for delivery of compressed cleaning air or gas to the system.

With reference to FIGS. 5 and 7, the floating stripper top 106 of the system 100 may also be provided with internal air flow passages 162. The internal air flow passages 162 are formed in the floating stripper top 106 and are in communication with the crimp block openings 144. The internal air flow passages 162 are configured for delivery of compressed cleaning air or gas to the crimp block openings 144, either during or following the swaging operation, for removal of shavings or other swaging particulates from the knurled studs 6 when swaged by the crimp block cap 140. For example, as shown in FIG. 5, the internal air flow passages 162 may be connected by high pressure air conduits 164 to a compressed air or gas source (not shown). The conduits 164 and the air or gas source may also be in communication with suitable valves (not shown) and actuators (not shown) to permit a selective and periodic delivery of the compressed cleaning air or gas to the crimp block openings 144, for example, by operation of the controller 114, within the scope of the present disclosure.

Figure 3:
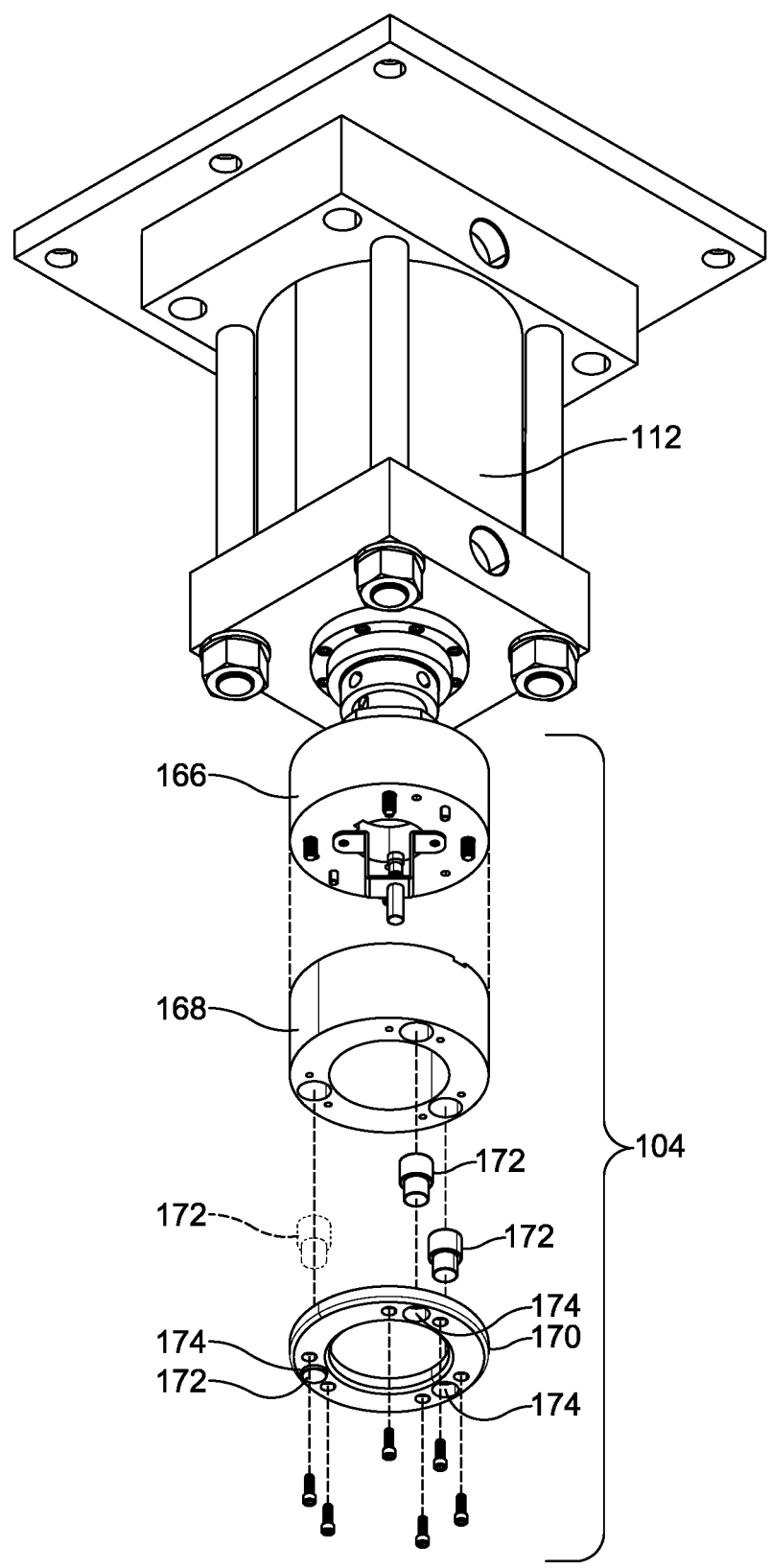
FIG. 3 is an exploded bottom perspective view of a press head assembly of the system shown in FIG. 1.

As shown in FIG. 3, it should be appreciated that the press head assembly 104 of the system 100 may include a pusher head 166, a pusher head ring 168, a stud retainer ring 170, and a plurality of stud press pins 172. The stud retainer ring 170 may have a plurality of stud holes 174, each of which receives a lower portion of one of the stud press pins 172 upon assembly. It should be appreciated that the lower portions of the stud press pins 172 extend through the stud holes 174, and protrude downwardly from the stud holes 174 on the bottom side of the stud retainer ring 170. The lower portions of the stud press pins 172 are thereby configured to contact the heads 28 of the knurled studs 6 during the method 200 for assembly of the top mount 2. This is particularly advantageous, as the heads 28 of the knurled studs 6 are otherwise spaced apart from and disposed beneath an upper edge of the recesses in the top mount body 4 within which they are disposed. In particular, it should be appreciated that the stud press pins 172 are the primary portions of the press head assembly 104 that that contact the knurled studs 6 of the present disclosure.

Figure 4:
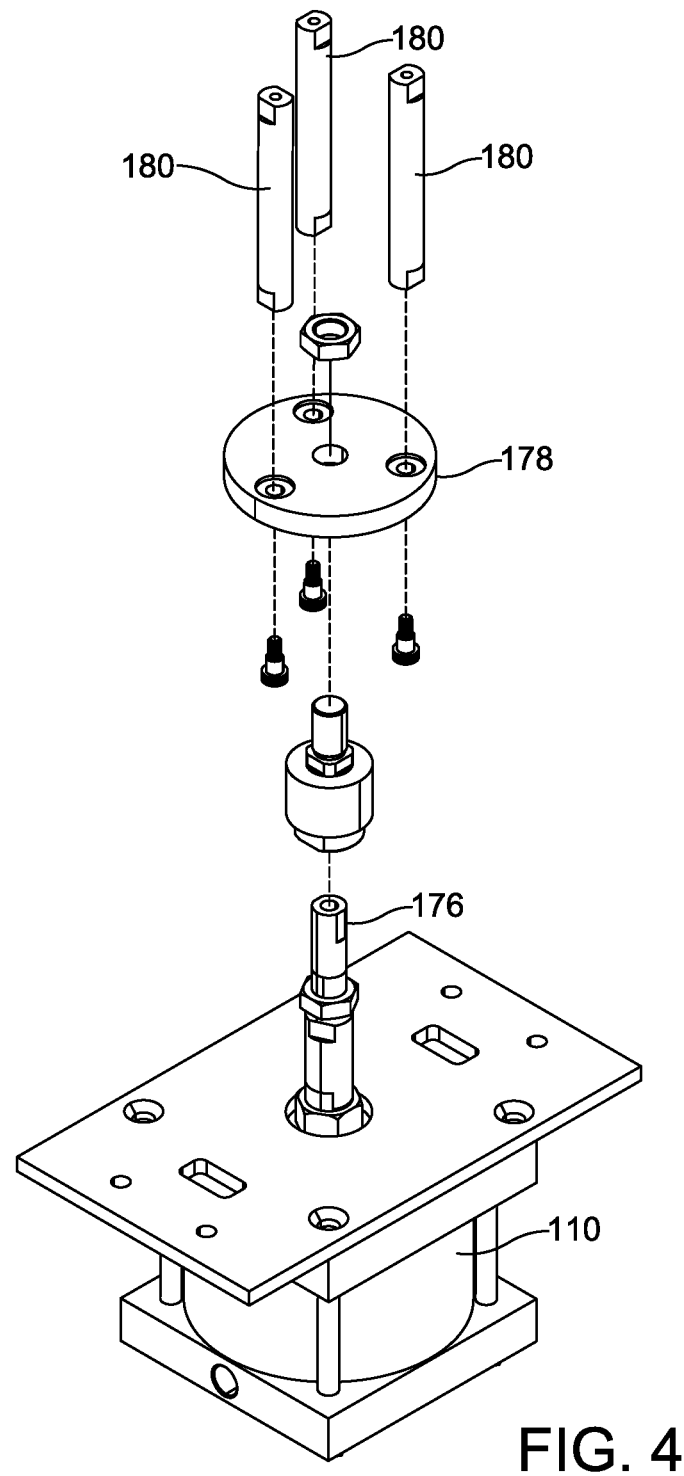
FIG. 4 is an exploded top perspective view of a bottom pusher plate assembly of the system shown in FIG. 1.

As shown in FIG. 4, the assembly die 102 of the system 100 is connected to the floating top actuator 110 via mechanical linkages 176 and a bottom pusher plate 178. The bottom pusher plate 178 is affixed to a plurality of adapter rods 180. In turn, the adapter rods 180 are slidably disposed through apertures (shown in FIG. 5) in the fixed die base 108 and attached to the floating stripper top 106. The floating stripper top 106 is moved by the floating top actuator 110 via the adaptor rods 180, as described further herein.

Referring now to FIGS. 9-14, the method 200 of the present disclosure is illustrated. The method 200 includes a step 202 of providing the components of the top mount 2, including top mount body 4 having the bushing opening 10 and the plurality of stud holes 14, the plurality of knurled studs 6, and the bushing 8 having the thermoplastic outer shell 18, the rubber core 20, and the central washer 22.

Figure 10:
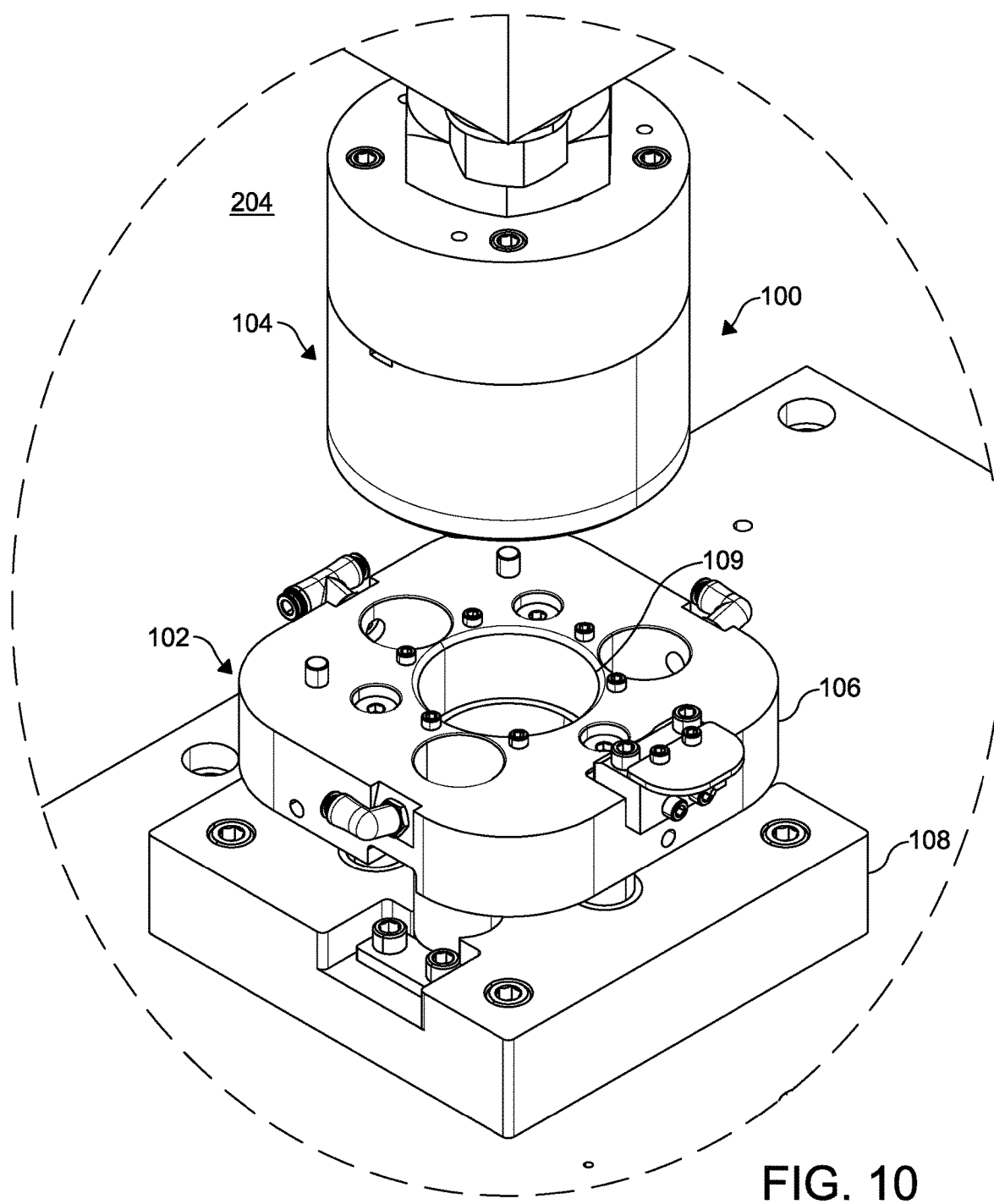
FIG. 10 is a partial top perspective view of the system shown in FIG. 1, depicted in a resting position immediately prior to installation of a first component in the assembly process and having an empty assembly die.

In a step 204, also depicted in FIG. 10, the system 100 described hereinabove is provided in a resting position ready for loading with the components for assembly of the top mount 2.

Figure 11:
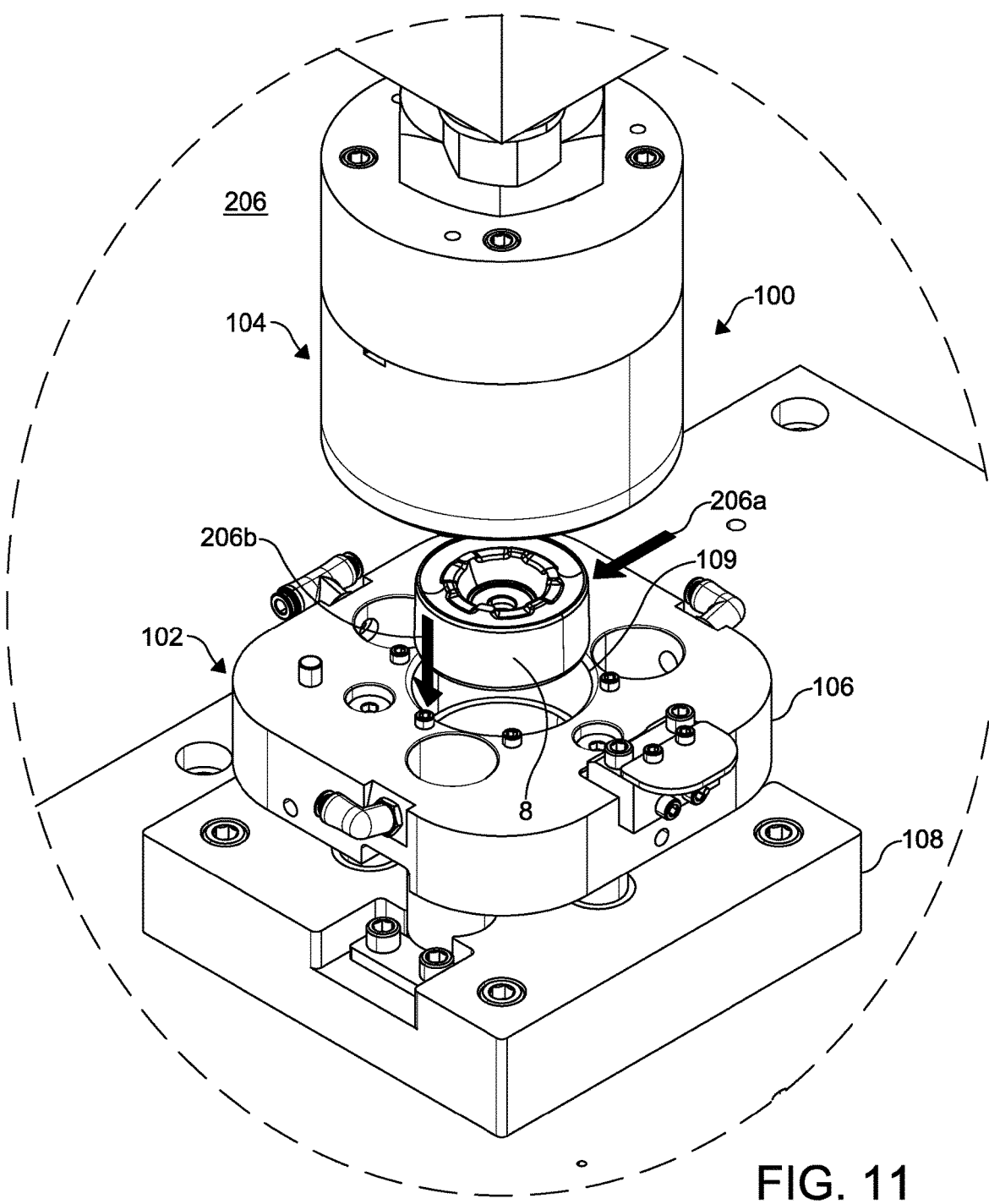
FIG. 11 is a partial top perspective view of the system shown in FIG. 1, depicted in a first step of the assembly process with the bushing loaded into the assembly die.
Figure 12:
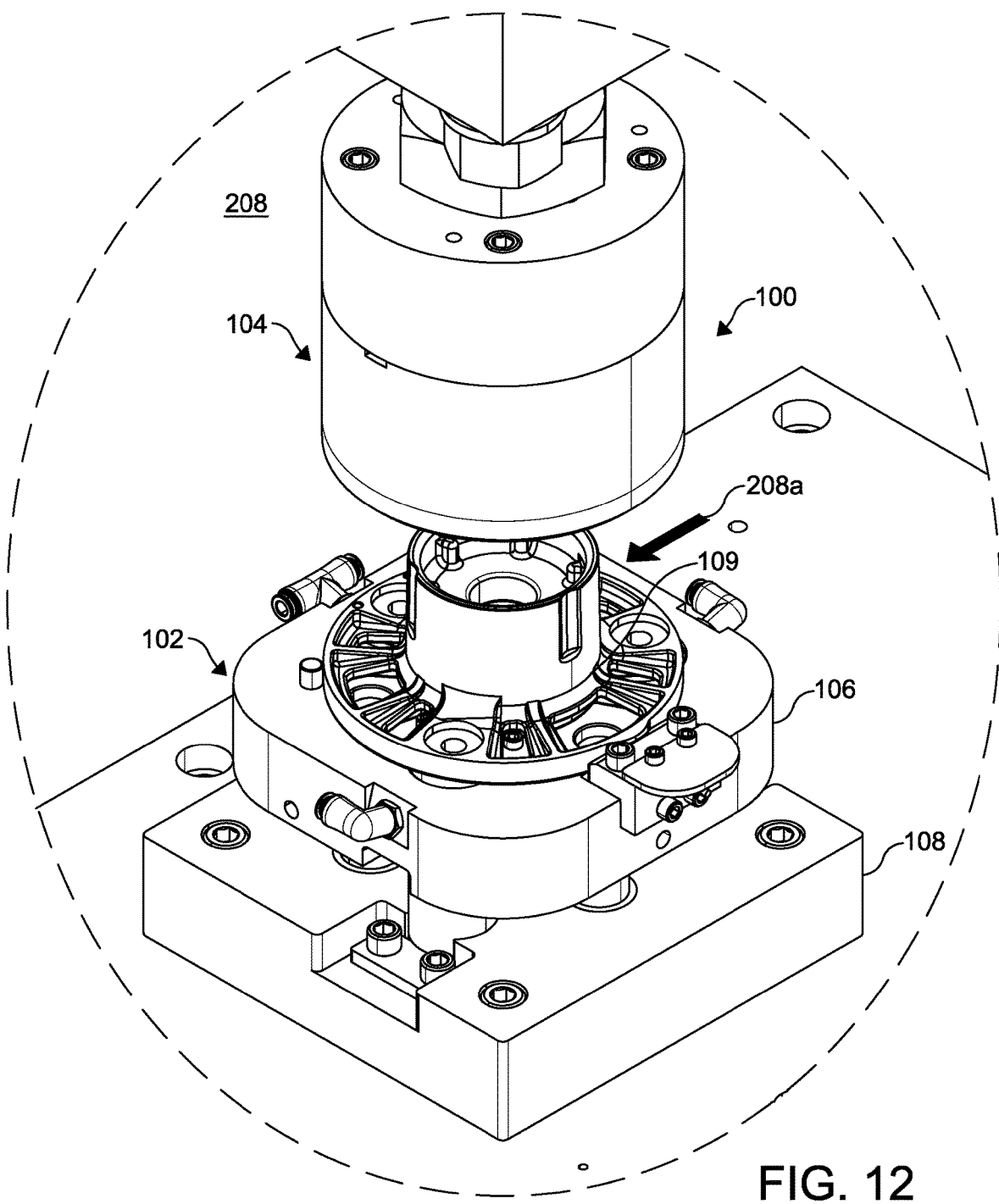
FIG. 12 is a partial top perspective view of the system shown in FIG. 1, depicted in a second step of the assembly process with the top mount body loaded on top of the bushing in the assembly die.
Figure 13:
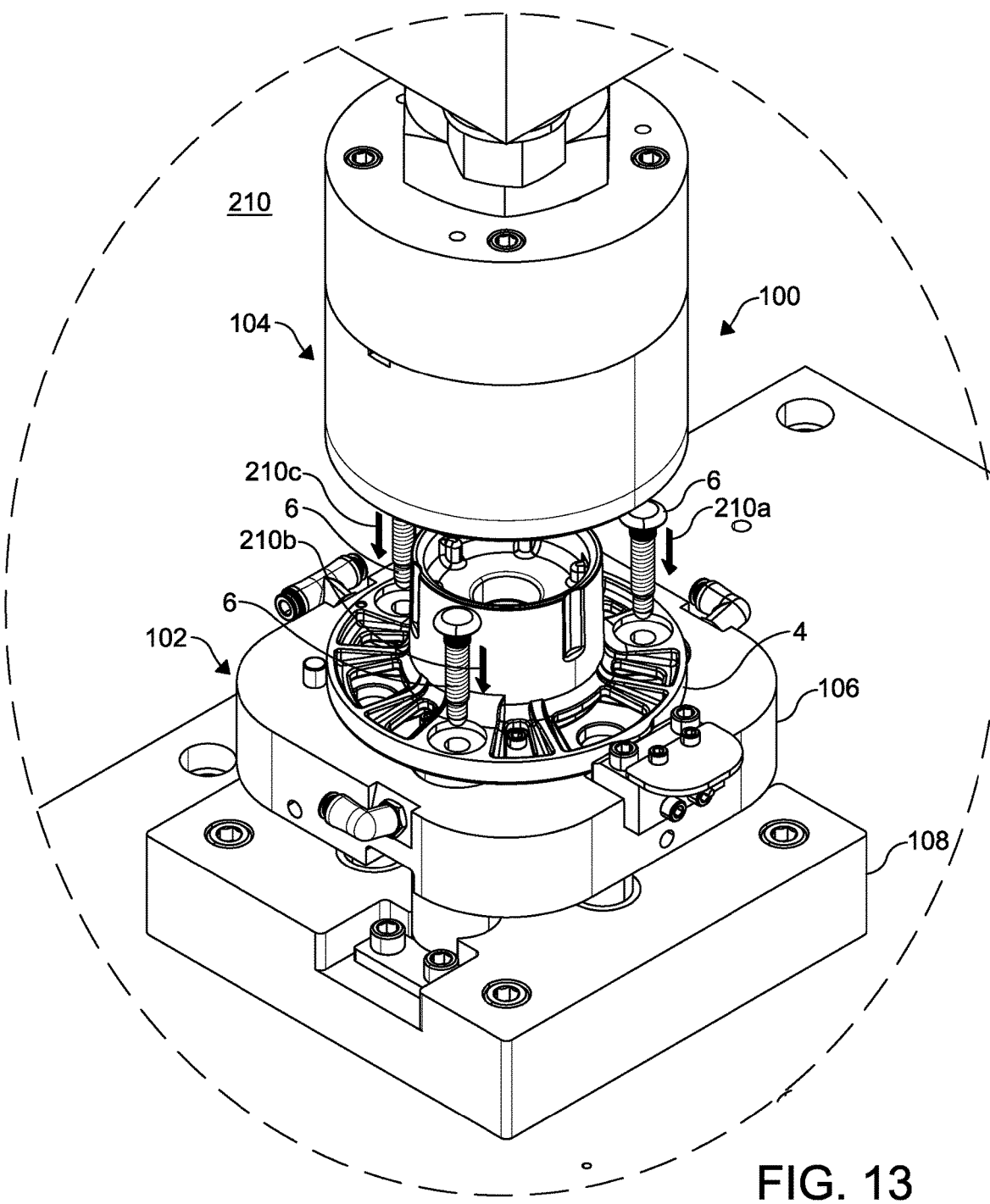
FIG. 13 is a partial top perspective view of the system shown in FIG. 1, depicted in a third step of the assembly process with the studs loaded through the top mount body into the crimp blocks of the assembly die.

The method 200 next includes a step 206 of inserting the bushing 8 into the primary opening 109 of the floating stripper top 106, for example, as shown by directional arrows 206a and 206b depicted in FIG. 11. Where inserted into the primary opening 109, the bushing 8 is firmly supported against downward movement by the bushing support 111 that is attached to the fixed die base 108 and otherwise remains stationary, as shown in FIG. 8.

Following the insertion of the bushing 8 in the step 206, the method 200 also includes a step 208 of positioning the top mount body 4 adjacent to the primary opening 109 of the floating stripper top 106. In particular, the top mount body 4 is positioned adjacent to or directly above the previously inserted bushing 8, for example, as shown by directional arrow 208a in FIG. 12. In this position, the bushing opening 10 of the top mount body 4 is aligned with the bushing 8 while being firmly held by the bushing support 111.

The method additionally includes a step 210 of inserting the knurled studs 6 in the stud holes 14 of the top mount body 4. In particular, and as shown by the directional arrows 210a, 210b, and 210c depicted in FIG. 13, each of the knurled studs 6 is inserted through the stud holes 14 and is caused to be seated in the swaging assemblies 136 including the crimp blocks 138 with removable crimp block caps 140, for example, as shown in FIGS. 6A and 6B.

Following the insertion of the knurled studs 6 in the stud holes 14 of the top mount body 4, the method includes a step 212 of applying a pressure to the knurled studs 6 and substantially simultaneously to the top mount body 3 itself, to thereby form the top mount 2 of the present disclosure.

For example, the step 212 may include a causing of the press head assembly 104 to move downwardly from the resting position to a crimping position, as shown by directional arrow 212a in FIG. 14. Due to the downward movement of the press head assembly 104, and as shown by directional arrow 212b in FIG. 14, the press head assembly 104 pushes the top mount body 4 downwardly onto the bushing 8 being supported by the bushing support 111. The press head assembly 104 likewise contacts the heads 28 of the knurled studs 6 to cause the knurled studs to be seated, as shown by directional line 212c in FIG. 14. This movement results in a crimping of the knurled studs 6 in the stud holes 14 of the top mount body 4.

As shown by directional line 212d in FIG. 14, the press head assembly 104 then retracts when the assembly of the top mount 2 is completed. The floating stripper top 106 likewise rises to strip the finished top mount 2 from the swage assemblies 136, as shown by directional line 212e in FIG. 14.

It should be appreciated that, in the method 200 for assembly of the top mount 2, the floating stripper top 106 moves a predetermined distance in tandem with the press head assembly 104 during the crimping operation. Likewise, the press head assembly 104 moves toward the resting position following the applying of the pressure to the knurled studs 6 to insert and crimp the knurled studs 6 in the stud holes 14 of the top mount body 4, and the insertion of the bushing 8 into the bushing opening 10 of the top mount body 4.

Furthermore, it should be understood that the top mount 2 of the vehicle suspension is presented assembled and ready for removal from the system 100 by the operator via the returning of the floating stripper top 106 to the resting position following the moving of the floating stripper top 106 the predetermined distance in tandem with the press head assembly 104. This return thereby completes the crimping operation, and allows the operator to both remove the assembled top mount 2 and position additional components for manufacturing of more of the top mounts 2, as described herein.

Advantageously, the system 100 and method 200 for manufacturing the top mount 2 of the present disclosure involves a single station or press assembly. Likewise, the system and method are efficient and permit for a rapid manufacture of the top mount 2 by an individual operator, which has heretofore not been possible with conventional top mount manufacturing systems.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A system for manufacturing a top mount of a vehicle suspension, comprising:
   an assembly die including
      a floating stripper top having a primary opening, a plurality of stud openings, and a plurality of crimp block openings formed therethrough, the primary opening configured to receive a bushing having a thermoplastic outer shell, a rubber core, and a central washer, an upper surface of the floating stripper top configured to receive a top mount body containing a plurality of knurled studs in stud holes of the top mount body in a position adjacent to the primary opening, the stud openings configured to receive the knurled studs, and a fixed die base having a plurality of swage assemblies and supporting a bushing rest, the floating stripper top slidably disposed over the swage assemblies and the bushing rest, with each of the swage assemblies disposed in one of the crimp block openings of the floating stripper top, and the bushing rest disposed in the primary opening of the floating stripper top, each of the swage assemblies configured to receive one of the knurled studs, and the bushing rest configured to support and align the bushing within primary opening of the floating stripper top; and a press head assembly configured to selectively move to and from a resting position spaced apart from the assembly die and a crimping position in contact with the assembly die, the press head assembly in the crimping position contacting the knurled studs to crimp the top mount body adjacent the knurled studs and affix the knurled studs to the top mount body, and the press head assembly also configured to force the floating stripper top and the top mount body downward onto the bushing supported by the bushing rest, to thereby affix the bushing to the top mount body, wherein both the crimping of the top mount body with the knurled studs and the affixing of the bushing to the top mount body are achieved with a single vertical downward motion of the press head assembly.

2. The system of claim 1, wherein the floating stripper top is coupled to a floating stripper top actuator, the floating stripper top actuator configured to cause the floating stripper top to move a predetermined distance in tandem with the press head assembly as the press head assembly moves toward the resting position following a crimping operation.

3. The system of claim 2, wherein the floating stripper top actuator is a pneumatic stroke cylinder.

4. The system of claim 1, wherein the press head assembly is coupled to a press head assembly actuator, the press head assembly actuator configured to cause the press head assembly to selectively move to and from the resting position and the crimping position.

5. The system of claim 4, wherein the press head assembly actuator is a hydraulic stroke cylinder.

6. The system of claim 1, further comprising a controller configured to selectively move the press head assembly and the floating stripper top.

7. The system of claim 1, further comprising a plurality of sensors including at least one of a force sensor and a position sensor, the sensors in communication with the controller and providing feedback on at least one of a force applied by the press head assembly and a position of at least one of the floating stripper top.

8. The system of claim 1, wherein the floating stripper top, the fixed die base, and the press head assembly, are mounted in a unitary frame assembly.

9. The system of claim 8, further comprising a bushing oven disposed adjacent the unitary frame assembly, the bushing oven configured to preheat the bushing to a predetermined temperature prior to the bushing being received by the primary opening of the floating stripper top.

10. The system of claim 1, wherein the bushing rest has an annular recess that is configured to receive a peripheral free edge of the thermoplastic outer shell of the bushing.

11. The system of claim 1, wherein each of the swage assemblies has a crimp block and a crimp block cap, the crimp block cap removably affixed to the crimp block with at least one fastener, the crimp block further received by a crimp block opening formed in the fixed die base.

12. The system of claim 11, wherein the crimp block cap has a swage opening for receiving one of the knurled studs, the swage opening having a chamfered swaging surface.

13. The system of claim 1, further comprising a proximity sensor disposed on a front portion of the floating stripper top, the proximity sensor covered by a sensor shield affixed to the floating stripper top.

14. The system of claim 13, wherein the top mount body has a locator disposed on a perimeter of the top mount body which is configured to align with the sensor shield to indicate a proper positioning of the top mount body on the upper surface of the floating stripper top.

15. The system of claim 1, wherein the floating stripper top has internal air flow passages formed therein and in communication with the crimp block openings for delivery of compressed cleaning air to the crimp block openings.

16. A system for manufacturing a top mount of a vehicle suspension, comprising:

in a unitary frame assembly
an assembly die including
a floating stripper top having a primary opening, a plurality of stud openings, and a plurality of crimp block openings formed therethrough, the primary opening configured to receive a bushing having a thermoplastic outer shell, a rubber core, and a central washer, an upper surface of the floating stripper top configured to receive a top mount body containing a plurality of knurled studs in stud holes of the top mount body in a position adjacent to the primary opening, the stud openings configured to receive the knurled studs, and a fixed die base having a plurality of swage assemblies and supporting a bushing rest, the floating stripper top slidably disposed over the swage assemblies and the bushing rest, with each of the swage assemblies disposed in one of the crimp block openings of the floating stripper top, and the bushing rest disposed in the primary opening of the floating stripper top, each of the swage assemblies configured to receive one of the knurled studs, and the bushing rest configured to support and align the bushing within primary opening of the floating stripper top, wherein the bushing rest has an annular recess that is configured to receive a peripheral free edge of the thermoplastic outer shell of the bushing, and wherein each of the swage assemblies has a crimp block and a crimp block cap, the crimp block cap removably affixed to the crimp block with at least one fastener, the crimp block further received by a crimp block opening formed in the fixed die base, and wherein the crimp block cap has a swage opening for receiving one of the knurled studs, the swage opening having a chamfered swaging surface;

a press head assembly configured to selectively move to and from a resting position spaced apart from the assembly die and a crimping position in contact with the assembly die, the press head assembly in the crimping position contacting the knurled studs to crimp the top mount body adjacent the knurled studs and affix the knurled studs to the top mount body, and the press head assembly also configured to force the floating stripper top and the top mount body downward onto the bushing supported by the bushing rest, to thereby affix the bushing to the top mount body, wherein both the crimping of the top mount body with the knurled studs and the affixing of the bushing to the top mount body are achieved with a single vertical downward motion of the press head assembly;

a floating stripper top actuator coupled to the floating stripper top, the floating stripper top actuator configured to cause the floating stripper top to move a predetermined distance in tandem with the press head assembly as the press head assembly moves toward the resting position following a crimping operation, wherein the floating stripper top actuator is a pneumatic stroke cylinder;

a press head assembly actuator coupled to the press head assembly, the press head assembly actuator configured to cause the press head assembly to selectively move to and from the resting position and the crimping position, wherein the press head assembly actuator is a hydraulic stroke cylinder; and a controller configured to selectively move the press head assembly, and the floating stripper top; and a bushing oven disposed adjacent the unitary frame assembly, the bushing oven configured to preheat the bushing to a predetermined temperature prior to the bushing being received by the primary opening of the floating stripper top.

17. A method for manufacturing a top mount, the method comprising the steps of:

providing a system, the system having:

an assembly die including a floating stripper top having a primary opening, a plurality of stud openings, and a plurality of crimp block openings formed therethrough, the primary opening configured to receive a bushing having a thermoplastic outer shell, a rubber core, and a central washer, an upper surface of the floating stripper top configured to receive a top mount body containing a plurality of knurled studs in stud holes of the top mount body in a position adjacent to the primary opening, the stud openings configured to receive the knurled studs, and a fixed die base having a plurality of swage assemblies and supporting a bushing rest, the floating stripper top slidably disposed over the swage assemblies and the bushing rest, with each of the swage assemblies disposed in one of the crimp block openings of the floating stripper top, and the bushing rest disposed in the primary opening of the floating stripper top, each of the swage assemblies configured to receive one of the knurled studs, and the bushing rest configured to support and align the bushing within primary opening of the floating stripper top; and a press head assembly configured to selectively move to and from a resting position spaced apart from the assembly die and a crimping position in contact with the assembly die, the press head assembly in the crimping position contacting the knurled studs to crimp the top mount body adjacent the knurled studs and affix the knurled studs to the top mount body, and the press head assembly also configured to force the floating stripper top and the top mount body downward onto the bushing supported by the bushing rest, to thereby affix the bushing to the top mount body, wherein both the crimping of the top mount body with the knurled studs and the affixing of the bushing to the top mount body are achieved with a single vertical downward motion of the press head assembly;

providing the top mount body having a bushing opening and the plurality of stud holes, the plurality of knurled studs, and the bushing having the thermoplastic outer shell, the rubber core, and the central washer;

inserting the knurled studs in the stud holes of the top mount body; and substantially simultaneously, applying a pressure to the knurled studs to press the knurled studs into the top mount body to crimp the knurled studs in the stud holes of the top mount body, and to insert the bushing into the bushing opening of the top mount body.

18. The method of claim 17, wherein the floating stripper top moves a predetermined distance in tandem with the press head assembly, and the press head assembly moves toward the resting position following the applying of the pressure to the knurled studs to insert and crimp the knurled studs in the stud holes of the top mount body, and the insertion of the bushing into the bushing opening of the top mount body.

19. The method of claim 18, wherein the top mount of the vehicle suspension is presented assembled and ready for removal from the system by a returning of the floating stripper top to a beginning position following the moving of the floating stripper top the predetermined distance in tandem with the press head assembly.

\* \* \* \* \*